(12) United States Patent
Serad (10) Patent No.: US 10,979,381 B2
(45) Date of Patent: *Apr. 13, 2021

(54) SOCIAL NETWORK BASED ON GPS AND OTHER NETWORK CONNECTIONS

(71) Applicant: Roger Serad, Corono Del Mar, CA (US)

(72) Inventor: Roger Serad, Corono Del Mar, CA (US)

(*) Notice: Subject to any disclaimer, the term of this patent is extended or adjusted under 35 U.S.C. 154(b) by 124 days.

This patent is subject to a terminal disclaimer.

(21) Appl. No.: 16/439,737

(22) Filed: Jun. 13, 2019

(65) Prior Publication Data

US 2019/0297049 A1 Sep. 26, 2019

Related U.S. Application Data

(63) Continuation of application No. 13/895,430, filed on May 16, 2013, now Pat. No. 10,367,773.

(51) Int. Cl.
*H04L 12/58* (2006.01)
*G06Q 30/02* (2012.01)
(Continued)

(52) U.S. Cl.
CPC ......... *H04L 51/32* (2013.01); *G06Q 30/0213* (2013.01); *G06Q 30/0257* (2013.01);
(Continued)

(58) Field of Classification Search
CPC combination set(s) only.
See application file for complete search history.

(56) References Cited

U.S. PATENT DOCUMENTS

| 7,751,826 B2 * | 7/2010 | Gardner | G01S 19/34 |
| | | | 455/456.1 |
| 2008/0070593 A1 * | 3/2008 | Altman | H04L 63/102 |
| | | | 455/457 |

(Continued)

FOREIGN PATENT DOCUMENTS

CN 103501490 B * 5/2017 ............ H04W 48/20

OTHER PUBLICATIONS

Zu, Zhengdao, Efficient Location Constraint Processing for Location-Aware Comptuing, 2009, thesis submitted in conformity with the requirements of Doctor of Philosophy Graduate Department of Computer Science University of Toronto, p. 1-239 (Year: 2009).*

*Primary Examiner* — Marie P Brady
(74) *Attorney, Agent, or Firm* — Bayramoglu Law Offices LLC (57) ABSTRACT

A method for interactively providing information to a user over a network, including: transmitting a stream of data from a server to a first user device through the network and displaying the stream of data on the first user device; receiving a first location information of the first user device through a first beacon signal from a first beacon installed on the first user device and including the first user location information in the stream of data sent to the first user device; receiving a preference information of a first user from the first user device over the network; and sending a stream of data related to the preference information of the first user to the first user device based on the first user location information of the first user device.

19 Claims, 9 Drawing Sheets

(51) Int. Cl.
  *G06Q 50/00* (2012.01)
  *H04W 4/029* (2018.01)
  *H04L 29/06* (2006.01)
  *H04L 29/08* (2006.01)
  *H04W 4/02* (2018.01)

(52) U.S. Cl.
  CPC ......... *G06Q 50/01* (2013.01); *H04L 65/4069* (2013.01); *H04W 4/029* (2018.02); *H04L 67/306* (2013.01); *H04W 4/02* (2013.01)

(56) References Cited

U.S. PATENT DOCUMENTS

| | | | |
|---|---|---|---|
| 2009/0233629 A1* | 9/2009 | Jayanthi | H04W 4/024 455/457 |
| 2010/0279713 A1* | 11/2010 | Dicke | H04M 1/72572 455/457 |
| 2012/0047565 A1* | 2/2012 | Petersen | G06Q 50/01 726/7 |
| 2016/0080306 A1* | 3/2016 | Kesarwani | H04L 65/601 709/204 |

* cited by examiner

SOCIAL NETWORK BASED ON GPS AND OTHER NETWORK CONNECTIONS

CROSS REFERENCE TO THE RELATED APPLICATIONS

This application is a continuation application of U.S. patent application Ser. No. 13/895,430 filed on May 16, 2013, now allowed.

BACKGROUND

The present invention relates to a social network wherein GPS and other network connections are used.

SUMMARY

The invention is system and method for extending social networking features to a map based system Social Navigation. It is called MySocialGPS where you can, use Active Maps to locate friends, locate social activities, and send Active Messages, Plan Social Activities and Socialize. In addition to regular social networking features, a BeaconID is generated by the system to enable social mapping on the Social GPS "SGPS" of Friends, Businesses, Places, Events and Deals. The ~BeaconID enables enhanced GPS functionality enabling a dynamic Friend location to be shared and to become a destination. the proposed system will have coupons and deals from merchant partners. The system provides a portal for merchants to upload their deals and coupons. MySocialGPS has a deals-events search engine, which connects to the other websites, retrieves and consolidates Friends, Featured Places, Events and Deals then displays them on the Social GPS Map for its users. Friends, Featured Places, Deals and Events are location specific and their display depends on current or selected location or TimePeriod of the user.

My Social GPS has functionalities for three types of users. User (Profile Owner), merchant (business partner) and admin. Core of the system is a crawler-based search engine, which retrieves Featured Places, deals, coupons and events from associated websites relevant to user's interests and locations.

Mobile algorithm is generated to support the system functionalities and enabling/disabling the user's Beacon ID. Mobile algorithm allows users to use features "on the go" using their mobile devices.

BRIEF DESCRIPTION OF THE DRAWINGS

Further characteristics and advantages of the invention will become apparent from the detailed description of a preferred and further embodiments of the invention, which are illustrated only by way of non-limitative example in the accompanying drawings, wherein.

DETAILED DESCRIPTION OF THE EMBODIMENTS

Figure 1:
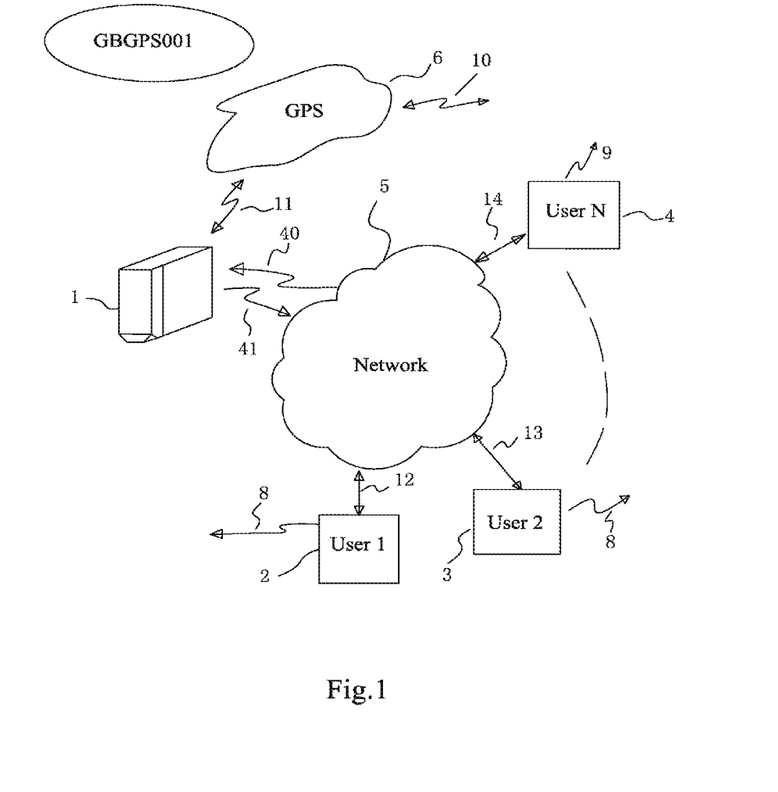
FIG. 1 shows the setup of the social network

FIG. 1 shows the My Social GPS system. The system comprises server 1, GPS network 6, user device 2, user device 3 and user device 4. Three user devices shown in FIG. 1, however the system may include more than three user devices. Three devices are shown as an example and this should not be considered as a limitation of My Social GPS system. Network 5 is used to establish communication between server 1 and user devices 2 through 4. User devices 2 through 4 can establish communication either by using Ethernet network protocol, cellular network protocol or any other wired or wireless protocol that can facilitate a communication link between server 1 and user devices 2 through 4. User devices 2 through 4 may have the same or different control programs running on them controlling their operations and communication with server 1 and GPS network 6. Server 1 has a computer program running on server 1. Server 1 receives information from user devices 2 through 4 via network 5 and sends information to user devices 2 through 4 via network 5 for displaying the information on user devices 2 through 4. User devices 2 through 4 have displays on them to display the information sent to user devices 2 through 4 by server 1. User devices 2 through 4 have beacons located in them. When turned on, the beacon on a user device communicates with server 1 and GPS system 6. Server 1 also communicates with GPS system 6 by link 11. As a result, server 1 gets the location information for user devices 2 through 4 from GPS network 6. Server 1 then has the information of the location of user devices 2 through 4 on a map. The information communicated to user devices 2 through 4 by the server 1 via network 5.

The user controlling user device 2 can enter user specific information into user device 2. The information may include which music the user likes, which books the user likes to read, which movies the user likes, which TV shows the user likes and which games the user enjoys. The information is communicated to server 1 from user device 2 and stored in server 1. Any user controlling any user device can enter the profile information into that particular user device to be stored in server 1. Each user can also set up user privacy options. These options include privacy settings for beacon visibility either at street level or at city level or no visibility, social planning privacy, availability, general privacy and notifications settings. A user controlling any user device can change these settings for their own preference. A user can also manage friends list, can add and remove friends from the friends list. A user can add photographs into a user device. For example the user controlling user device 2 can enter photographs into user device 2. These photographs are sent to server 1 and stored in server 1. When the user log into user device 2 then photographs stored in server 1 will be available to the user log in to user device 1. Any user can log into any available user device in the system. All user devices communicate with server 1. This way all user devices can communicate with each other. A user can select the planner option and plan Socialactivities. A user can select the Social GPS option on user device screen. When SGPS option is selected, a map showing the user's location is shown. Then the user has options to select activities to be displayed on the map. These options may include arcades, art galleries, cinemas, festivals, music, museums, performing arts, social clubs, wineries, beauty and spas, food, hotels, nightlife, cuisine, sports, services, fun, shopping and local flavor, etc. Other activities can be added to this list. When user selects one or more of these activities, these activities are displayed on the map on user device screen. A user can also select the filter option to filter the information to be displayed. The filter may include elements such as rating for the activity, price for the activity and the particular activity. A user can select either events, friends, deals and featured places or a user can select all of them. A user can also select any of the activity or all of the activities to be displayed on the map. A user can select the timeline option to see social activities based on a timeline.

Figure 2:
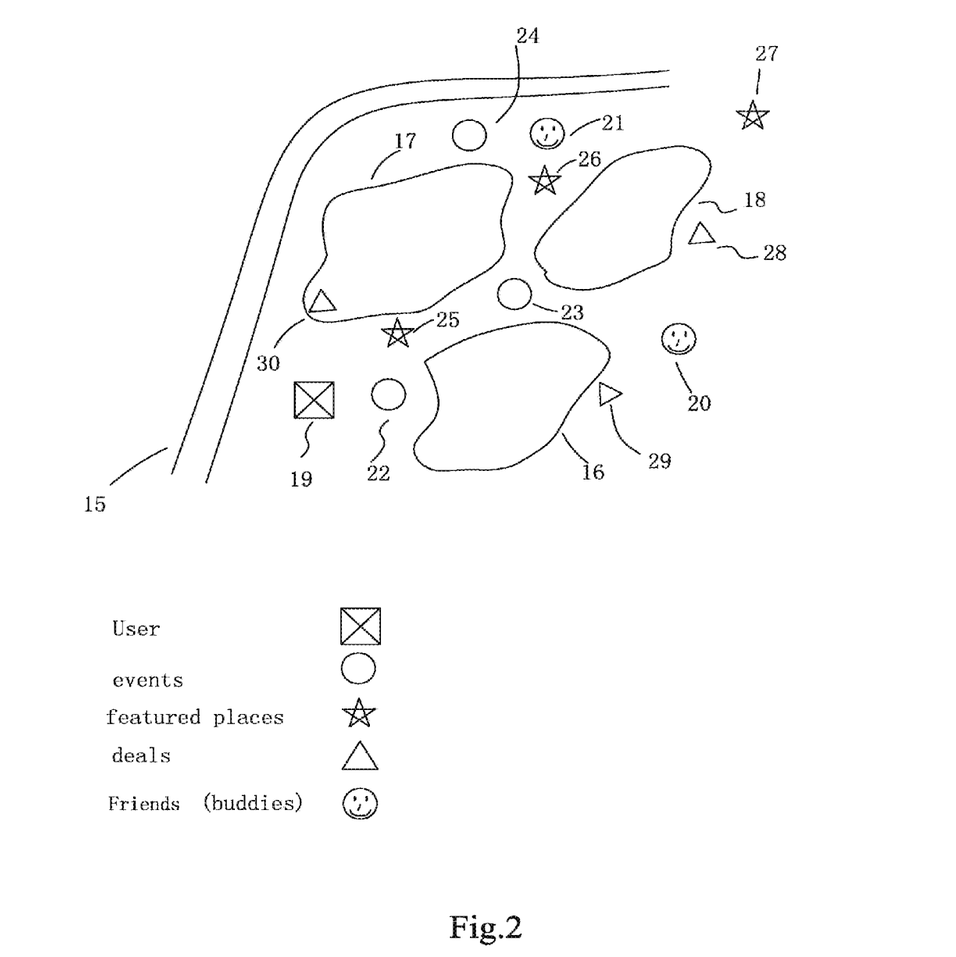
FIG. 2 shows how different features are presented on a map

FIG. 2 shows a representation of a map that is displayed on each user device 2 through 4. In this embodiment, different items are shown on the map. For example, a map displayed on the user device 2 through 4 may comprise a user 19, events 22, 23 and 24, featured places 25, 26 and 27, deals 28 and 29, and friends 20 and 21. One user device, three events, three featured places, two deals and two friends are shown in FIG. 2. However, the invention is not limited to these numbers. The numbers of users, deals, events, featured places and friends can be more or less than what is presented in FIG. 2. The location information of user 19 is received by server 1 from GPS network 6. Upon obtaining this information, server 1 sends this information to user devices 2 thorough 4 to display the location of user device 19 on user devices 2 through 4. Each user device receives its own location information from server 1 which is then displayed on the user device. The location of user 19 in this embodiment corresponds to user device 2 in FIG. 1. Therefore, the location of user 19 is displayed on user device 2 as the user location of that device whereas the location of user 19 is displayed on other user devices 3 through 4 as friend if the users of user devices 3 through 4 selected user 19 of the user device 2 as a friend.

Server 1 in FIG. 1 communicates with user devices 2 through 4 via the network 5 to display the map in FIG. 2 on user devices 2 through 4. Server 1 receives the user devices location information either directly from GPS system 6 or from user devices 2 through 4 via network 5. The location information of the user 19 is included in the information sent back to user devices 2 through 4. In this embodiment, user device 2 is selected as an example, however server 1 communicates with all user devices. Server 1 receives user device 2 preferences from user device 2. Based on the user preferences and based on the user location, server 1 sends the location information of events 22, 23 and 24 to user device 2 to be displayed on user device 2. The location information of events 22, 23 and 24 are displayed on the map on user device 2. The map and the events displayed on user device 2 may be different than the maps and events displayed on user devices 3 and 4. That is because; user devices 3 and 4 may be in different locations compared to user device 2. Each user device 2 through 4 has a different map displayed on their devices based on their locations. Furthermore, each user device 2 through 4 will have different events displayed on their maps based on their preferences, locations and selected time period. Likewise, user device 2 can send different event selections to server 1 based on the selection made by the user that has the control of user device 2. Here, the control means a user has the possession of user device 2 and determines what selections to make on user device 2. Upon receiving the event selection information from user device 2, server 1 sends the detailed information about that event to user device 2 to be displayed on user device 2.

The user controlling user device 2 can send user device 3 and user device 4 a message and makes it active or selects a destination that can be a friend, a beacon id, a featured place, an event or a street address. If user device 3 and user device 4 accept the message, then a reply is sent and the private beacons of the accepting users are turned on. This enables the users to locate each other in the active message in real time on the social GPS. Private beacons are turned off by deleting the message or through the user beacon control function. If user device 3 and user device 4 accepts the message, then a reply is sent and the private beacons of the accepting users are turned on. This enables the users to locate each other in relationship to the destination. If the destination is a friend beacon id the location is dynamic.

Users can access others' social pages. User controlling user device 2 can select the user's name controlling user device 3 or the user's name controlling user device 4 or by selecting the beacon id of the user controlling user device 3 or the beacon id of the user controlling user device 4. Then the user controlling user device 2 will be transferred to the social page of the user controlling user device 3 or the user controlling user device 4 depending upon which one the user controlling user device 2 selects. The social page provides a social panorama of a particular user. A user's social panorama consists of but not limited to social planner, social recommendations, social check ins, social likes, social photos, social timeline and friends.

If the user controlling user device 2 selects the user controlling user device 3 then the user controlling user device 2 can see on the social GPS of the user controlling user device 3 the availability and non availability by day or week views if the user controlling user device 3 did not disable the planner visibility to friends or to specific users. The user controlling user device 2 with the appropriate visibility access can select a specific day or week of the user controlling user device 3 planner to check for the availability of the user controlling user device 3.

The user controlling user device 2 can select the user controlling user device 3 social recommendation and the user controlling user device 2 can see on the social GPS the recommendation of featured places, events and deals of the user controlling user device 3 of featured places, events and deals. The user controlling user device 2 can select a specific location on the map and view the social recommendation from the user controlling user device 3. The user controlling user device 2 can select social check ins of the user controlling user device 3, the user controlling user device 2 can see on the social GPS check ins of the user controlling user device 3 at featured places, events and any location the user controlling user device 3 checked in. The user controlling user device 2 can select a specific time period on the map and view social check ins of the user controlling user device 3, within that time period.

The user controlling user device 2 selects social likes of the user controlling user device 3, the user controlling user device 2 can see on the social GPS of the user controlling user device 3 and that user's social likes of featured places, events, deals and other social posts and activities. The user controlling user device 2 can select a specific location on the map and view social likes of the user controlling user device 3.

The user controlling user device 2 can select social photos of the user controlling user device 3 and the user controlling user device 2 can see on the social GPS social photos of the user controlling user device 3 that has been geo tagged by the user controlling user device 3 for location and time. The user controlling user device 2 can select a specific location on the map or a time period and view social photos of the user controlling user device 3. The user controlling user device 2 can select social timeline of the user controlling user device 3. The user controlling user device 2 can see social timeline of various social activities of the user controlling user device 3 on the social GPS. The user controlling user device 2 can select a specific location on the map or a time period and view the social timeline of the user controlling user device 3.

The embodiment above discusses the user controlling user device 1, the user controlling user device 3, and the user controlling user device 4. Of course number of users and user devices can be increased without limitation and any user controlling any user device can communicate and perform the aforementioned activities with any other user or users controlling other user devices. A user may control multiple user devices or a single user device.

The user that has the control of user device 2 can select to send invitation to friends 20 and 21. Upon this selection, user device 2 sends the information to server 1. Server 1 then sends invitation to those friends that are selected by the user that has the control of user device 2. The user has the ability to select which of user's friends are invited. It can be none of the user's friends, it can be some of the user's friends or it can be all of the user's friends. For example, in this embodiment the user that controls user device 2 has friend 20 and friend 21. The user that controls user device 2 can invite either friend 20 or friend 21 or can invite both friend 20 and friend 21.

User device 2 can also send information to server 1 to add a particular event to the user's calendar. Server 1 adds the particular event to the user's calendar upon request by user device 2. The user that controls the operation of user device 2 decides which events should be added. The user may select one event, more than one event or may select no event to be added to the user's calendar.

The user that controls user device 2 can select to participate to a particular event. When the user that controls user device 2 selects that option, user device 2 sends the information to server 1 and server 1 sends a message to the user's friends indicating that the user intends to attend a particular event. It is up to the user to select if the user's intend to participate a particular even should be communicated to user's friends or not. If the user wants that user's friends should be notified about user's intend of attending a particular event, then server 1 will send notification to the user's friends notifying them that the user intends to attend a particular event. If the user does not want the user's friends know about user's intention of attending a particular event, then the server 1 will not communicate the user's intention to the user's friends. The user has the ability to select which of user's friends can receive the intend to attend an event information. It can be none of the user's friends, it can be some of the user's friends or it can be all of the user's friends.

The user that controls user device 2 can enter the survey information about event 22, event 23 and event 24 into user device 2. User device 2 sends the survey information to server 1. Server 1 collects the survey information from user devices 2 through 4. Based on this information, server 1 sorts all the survey information received from user devices 2 through 4 and sends this information to user devices 2 through 4.

The user that controls user device 2 can enter comment information about event 22, event 23 and event 24 into user device 2. User device 2 sends the comment information to server 1. The server 1 collects the comments from the user devices 2 through 4. Server 1 sorts the comments received from user devices 2 through 4 and sends this information to user devices 2 through 4. Each user controlling user device 2 through 4 has the option to select to display the comments for event 22, event 23, and event 24. If the user controlling user device 2 selects to display the comment information for a particular event for example event 22 then server 1 sends comment information about event 22 to user device 2. This information is displayed on user device 2.

The user controlling user device 2 has the ability to recommend an event to the user's friends. If the user controlling user device 2 selects to send a user's recommendation to user's friend 20 and friend 21, then server 1 sends the recommendation information to friend 20 and friend 21. The user devices that are controlled by the friend 20 and friend 21 display this recommendation on their screens upon receiving the recommendation from server 1. The user that controls user device 2 has the ability to select which friend 20, friend 21 can receive the recommendation information. It can be none of the friends, it can be some of the friends or it can be all of the friends. The recommended event is placed on the user device 2 SGPS.

The user controlling the user device 2 has the ability to request updates on events 22, 23 and 24 in which case server 1 sends any updates about events 22, 23 and 24 to user device 2. The user controlling user device 2 can request update on a particular event or several selected events. Server 1 sends updates to user device 2 for the selected events.

The user controlling the user device 2 can also select one of event 22, event 23 and event 24 and add it to the user's favorite list. Once server 1 receives the user's request to add the event to the favorite list, server 1 adds the event to the user's favorite list and added on the user device 2 SGPS.

Server 1 in FIG. 1 communicates with user devices 2 through 4 via network 5 to display the map in FIG. 2 on users' device. Server 1 receives the user's location information either directly from GPS system 6 or the user's device via network 5. User location information is included in the information sent back to user device 2 by server 1. Here user device 2 is selected as an example in the system, server 1 may communicate with all user devices 2 through 4. Server 1 also receives the user's preferences from user devices 2. Based on these user preferences and based on user device 2 location, server 1 sends featured place 25 and featured place 26 information to user device 2 that are close to the location of user device 2.

The user controlling user device 2 has the ability to select a particular featured place from featured place 25, featured place 26 and featured place 27. When user device 2 sends a particular featured place selection to server 1, server 1 in return sends the detail information about that particular featured place to user device 2.

The user controlling the user device 2 is given the ability to invite friend 20 and friend 21 to a particular featured place selected from the featured place 25, featured place 26 and featured place 27. Server 1 sends invitation to those friends that are selected by the user controlling user device 2. The user controlling user device 2 has the ability to select which of friend 20 and friend 21 are invited. It can be none of the friends, it can be some of the friends or it can be all of the friends.

The user controlling the user device 2 can also add a particular featured place from featured place 25, featured place 26 and featured place 27 to the user's calendar. Server 1 adds the particular featured place to the user's calendar upon request by the user. The user may select one featured place, more than one featured place or may select no featured place to be added to the user's calendar.

The user controlling user device 2 can select to go to a particular featured place. When the user selects that option, user device 2 sends the information to server 1 and server 1 sends a message to user's friend 20 and friend 21 indicating that the user controlling user device 2 intends to go to a particular featured place. It is up to the user controlling user device 2 to select if the user's intend to go to a particular featured place should be communicated to friend 20 and friend 21 or not. If the user controlling user device 2 wants that friend 20 and friend 21 be notified about the user's intend to go to a particular event, then friend 20 and friend 21 are notified about user's intend of going to a particular featured place. Server 1 will send notification to friend 20 and friend 21 notifying them that the user controlling the user device 2 intends to go to a particular featured place. If the user controlling user device 2 does not want friend 20 and friend 21 know about the user's intention of going to a particular featured place, then server 1 will not communicate the user's intention to friend 20 and friend 21. The user controlling user device 2 has the ability to select which of friend 20 and friend 21 can receive the information about the user's intend to go to a featured place information. It can be none of the friend 20 and friend 21, it can be some of the friend 20 and friend 21 or it can be both friend 20 and friend 21.

The user controlling user device 2 can provide reviews about featured place 25, featured place 26 and featured place 27. Server 1 collects the reviews from those users that provide reviews for featured places. Server 1 sorts the reviews received from user devices and sends this information to each user device 2 through 4. Each user device 2 through 4 has the option to select to display the reviews for each featured place. If a user controlling the user device 2 selects to display the review for one of featured place 25, 26 and 27, server 1 sends the review information about that featured place to user device 2 to be displayed on user device 2.

The user controlling user device 2 has the ability to recommend a featured place to friend 20 and friend 21. If the user selects to send user's recommendation to user's friend 20 and friend 21, user device 2 sends this information to server 1. Upon receiving this information, server 1 sends the recommendation information to friend 20 and friend 21. User device 3 and user device 4 display this recommendation on the display of user device 3 and user device 4 upon receiving the recommendation from server 1. The user controlling user device 2 has the ability to select which of the user's friends can receive the recommendation information. It can be none of the user's friends, it can be some of the user's friends or it can be all of the user's friends. The recommended featured place is placed on the user device 2 SGPS.

The user controlling user device 2 has the ability to request updates on featured place 25, featured place 26 and featured 27 in which case server 1 sends any updates about featured places to user device 2. The user controlling user device 2 can request update on one or more of the featured place 25, featured place 26 and featured place 27. Server 1 sends updates for the selected featured events to user device 2.

The user controlling user device 2 can also select a featured place and add it to the user's favorite list. Once server 1 receives the user's request to add the featured place to the favorite list, server 1 adds the featured place to the user's favorite list and added on the user device 2 SGPS.

Server 1 in FIG. 1 communicates with user device 2, user device 3 and user device 4 via network 5 to display the map in FIG. 2 on user device 2, user device 3 and user device 4. Server 1 receives user device 2 location information either directly from GPS system 6 or from user device 2 via network 5. The location information of user device 2 is included in the information sent back to user device 2 by server 1. Here user device 2 is selected as an example in the system, server 1 communicates with user device 2, user device 3 and user device 4. Server 1 also receives user's preferences from user device 2. Based on these user preferences and based on user device 2 location, server 1 sends the information about featured place 25, featured place 26 and featured place 27 that are close to the location of user device 2.

The user controlling user device 2 has the ability to select a particular deal. When the user selects a particular deal, server 1 sends the detail information about that particular deal to user device 2.

The user controlling user device 2 is given the ability to invite his/her friends to a particular deal. Server 1 sends invitation to those friends that are selected by the user controlling user device 2. The user controlling user device 2 has the ability to select which of the user's friends are invited. It can be none of the user's friends, it can be some of the user's friends or it can be all of the user's friends.

The user controlling user device 2 can also add a particular deal to the user's calendar upon request by the user. The user may select one deal, more than one deal or may select no deal to be added to the user's calendar.

The user controlling user device 2 can also select to go to a particular event. When the user selects that option, user device 2 sends the information to the server 1 and the server 1 sends message to the user's friends indicating that the user intends to go to a particular deal. It is up to the user to select if user's intend to go to a particular deals should be communicated to user's friends or not. If the user wants that user's friends should be notified about user's intend of going to a particular deal, then server 1 will send notification to user's friends notifying them that the user intends to go to a particular deal. If user does not want user's friends know about user's intention of going a particular deal, then server 1 will not communicate the user's intention to user's friends. The user has the ability to select which of user's friends can receive the intent to go to a deal information. It can be none of the user's friends, it can be some of the user's friends or it can be all of the user's friends.

The user controlling user device 2 can input survey information about a deal. Server 1 collects the survey information from all the users. Based on this information, the server sorts all the surveys received from users and sends this information to each user.

The user controlling user device 2 can provide reviews about deals 28 and 29. Server 1 collects the review information from those users that provide review information for deals. Server 1 sorts the review information received from different users and sends this information to user device 2, user device 3 and user device 4. Each user controlling the corresponding user device has the option to select to display the reviews for deal 28 and deal 29. If a user controlling a user device selects to display the review for a particular deal, server 1 sends the review information about that deal to that user device.

The user controlling user device 2 has the ability to recommend a deal to user's friend 20 and friend 21. If user device selects to send user's recommendation to user's friends, server 1 sends the recommendation information to user's friends. User's friends device upon receiving the recommendation from the server 1 displays this recommendation on user's friends screen. The user has the ability to select which of user's friends can receive the recommendation information. It can be none of the user's friends, it can be some of the user's friends or it can be all of the user's friends.

The user controlling user device 2 has the ability to request updates on deal 28 and deal 29 in which case server 1 sends any update about deal 28 and deal 29 to user device 2. The user controlling user device 2 can request update on a particular deal or several deals events. Server 1 sends the user updates to user device 2 for the selected deals.

The user controlling user device 2 can also select a deal and add it to the user's favorite list. Once server 1 receives the user's request to add the deals to the favorite list, server 1 adds the deals to the user's favorite list.

Server 1 in FIG. 1 communicates with users' devices via the network 5 to display the map in FIG. 2 on user device 2, user device 3 and user device 4. Server 1 receives user device 2 location information either directly from GPS system 6 or from user device 2 via network 5. User location information is included in the information sent back to user device 2 by server 1. Here user device 2 is selected as an example in the system, server 1 communicates with all user devices. Server 1 also receives user's preferences from user device 2. Based on these user preferences and based on the user device 2 location, server 1 sends the user's social activities information that are close to the location of the user to user device 2. If the user controlling user device 2 selects a particular time frame for displaying the user's activities then server 1 sends related user's social activities to user device 2. If the user controlling user device 2 does not select any particular time frame then server 1 determines the time frame. When user device 2 requests to display the user's social activities, server 1 will send information to user device 2 wherein a new window is opened and the user's social activities are displayed.

A user controlling user device 2 can send a request to server 1 to plan a social activity. The user controlling user device 2 provides the details of the activity. Upon receiving this request, server 1 sends information to user device 2 to display options related to the social activity the user wants to start.

The user controlling user device 2 is given the ability to invite his/her friends to a particular social activity. Server 1 sends invitation to those friends that are selected by user device 2. The user controlling user device 2 has the ability to select which of user's friend 20 and friend 21 are invited. It can be none of the user's friends, it can be some of the user's friends or it can be all of the user's friends.

Server 1 in FIG. 1 communicates with users' devices via network 5 to display the map in FIG. 2 on user device 2, user device 3 and user device 4. Server 1 receives user device 2, user device 3 and user device 4 location information either directly from GPS system 6 or from user device 2, user device 3 and user device 4 via network 5. The location information of user device 2 is included in the information sent back to user device 2 by server 1. Here user device 2 is selected as an example; however server 1 can communicate with user device 2, user device 3 and user device 4. Server 1 based on the profile and selections determine which users are bodies of the user controlling the user device 2. The user's body is defined as another user that is selected by the user controlling the user device 2 as a friend of the user controlling the user device 2 and the user controlling the user device 2 wants to share multiple information with that another user. The user controlling user device 2 may or may not select to share the information with the user's friends. Upon receiving the preferences and the friend information of the user controlling user device 1, server 1 sends the user's friends information to user device 2 to be displayed on the map on user device 2. This way the user controlling user device 2 is able to see his or her friends on the map close to the location of user device 2. Server 1 sends the user's friends information to user device 2 even if the beacon of the user's friends devices are turned off. If the beacons of the user's friends devices are turned on then those friends' locations are displayed on panoramic view on user device 2. However if the beacons of the user's friends are turned off then server 1 sends the last locations of those friends to user device 2 where their beacon were turned off. When the user controlling user device 2 selects a friend then server 1 sends the detail information of that friend to user device 2. If the user controlling user device 2 wants more information about friend's friend then the user controlling user device 2 can select that friend's friend in which case server 1 will send the information about the friend's friend to user device 2. If the user controlling user device 2 wants to send a friend's request to the friend of the user's friend then this request is routed to the friend of the user's friend by server 1.

Server 1 sends sponsored activity list to user device 2 based on the user's preferences. These sponsored events are displayed on user device 2. If the user controlling user device 2 receives any message from the user's friends, system 1 routes this message to user device 2 and the message is displayed on user device 2. The user controlling user device 2 has the option to select either a map view or a list view. If the user controlling user device 2 selects a list view then server 1 sends the information and display format to user device 2 such that the information is displayed in a list format.

Server 1 sends social digest headline information to user device 2. The social digest headline information may either be displayed on the same display window or a separate display window is opened to display the social digest headline information. The user controlling user device 2 can also send invitation to those friends that user controlling user device 2 selects inviting them to the sponsored events.

Server 1 may send the date and time information for the selected sponsored activity to user device 2. The information is displayed on user device 2.

Server 1 may send direction information from the user's current location to the activity location. This information is received by user device 2 and displayed on user device 2.

Server 1 modifies an activity based on the request that is sent to server 1 by user device 2. Upon receiving the notice from user device 2, indicating that the beacon of user device 2 is turned on, server 1 sends a message to the friends of the user controlling user device 2 indicating that the user controlling user device 2 is on his/her way to attend a particular activity.

The user controlling user device 2 can plan a social activity. The user controlling user device 2 may enter a request to user device 2. This request is sent to server 1 by user device 2. Upon receiving the request to set up a social event, server 1 sends notifications to the friends of the user controlling user device 2 about the social event. The friends of the user receive the notification from server 1 based on the user's selection of the friends of the user. The user has the option of selecting whichever friend the user determines to select. The user may select some of the user's friends, all of the user's friends or none of the user's friends.

When the user controlling user device 2 receives messages from others, server 1 sends this information to user device 2 and the messages are displayed on user device 2. The number of messages is displayed on user device 2. The display also shows which messages are read by the user controlling user device 2 and which messages are not read by the user controlling user device 2. If there are any abusive messages that bother the user controlling user device 2, the user controlling user device 2 has the option of selecting to report those messages. When the user controlling user device 2 selects the option to report messages from another user, user device 2 sends that request to server 1. Server 1 then does not deliver those messages to user device 2 from certain other users selected by the user controlling user device 2. When the user controlling user device 2 wants to send a new message to another user, the user controlling user device 2 selects the new message option. When the user controlling user device 2 selects this option, server 1 adds the user name and the beacon information of user device 2 in the sender's name field. When the user controlling user device 2 finishes composing the message and selects the send option, the server sends the message to other users that are listed on the to field of the message. When the user controlling user device 2 moves and the user is on her/his way to an activity then a message sent to other users indicating that the user controlling user device 2 on his/her way to the activity. The initiation of this message may or may not depend on how long of a distance the user controlling user device 2 traveled from the location of the user. In one embodiment this distance can be approximately 50 feet. In other embodiments the distance can be less than or more than 50 feet.

In this embodiment the operation and interaction between user device 2 and server 1 and user device 3 and user device 4 described. The disclosure equally applies to user device 3 and user device 4. Furthermore there may be many more users controlling many more user devices on the network. The disclosure here and the operation will equally apply to all the users controlling all the user devices on the network. In addition, the operation may be performed by several and multiple user devices at the same time.

Figure 3:
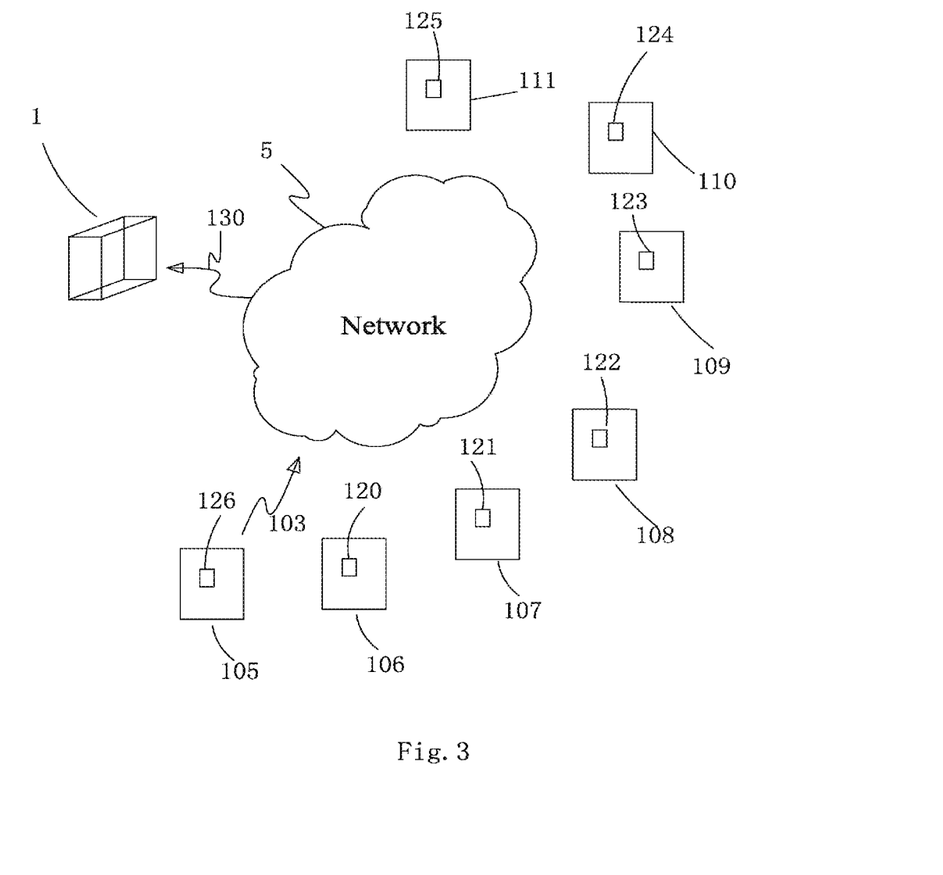
FIG. 3 shows the social network where users are connected to each other and communicate with each other

FIG. 3 shows the system that comprises server 1, a plurality of user devices 105 through 111 wherein the user devices communicate with server 1 via network 5. Each user device 105 through 111 has beacon id 120 through 126 respectively installed in the user devices 105 through 111. When beacon id 126 in user device 105 is turned on, signal 103 from user device 105 is sent to server 1. Server 1 gets this information via network 5 and signal 130 and server 1 uses this information to send messages to user devices 106 through 111 to display the location of user device 105 on social GPS (Global Positioning System) on all users devices 106 through 111. However user device 105 that sends beacon signal 103 to server 1 also sends a second message to server 1 indicating which user devices 106 through 111 should receive the location information of user device 105. This second message can either be embedded in beacon signal 103 or can be sent to server 1 as a separate signal. The user controlling user device 105 enters this information to user device 105. Server 1 follows this preference from the user device 105 to send the location information of user device 105 to user devices 106 through 111 that are selected by user device 105 based on the input from the user controlling user device 105. If the user controlling user device 105 selects to send messages to user devices 106, 107 and 108, server 1 sends the location information of user device 105 to user devices 106, 107 and 108. On the other hand user devices 109, 110 and 111 do not receive the location information of user device 105 from server 1 because user device 105 does not send the location information to server 1 selecting user devices 109, 110 and 111 indicating that the user controlling user device 105 does not want to share his/her location information with user devices 109, 110 and 111. The user controlling user device 105 can change this selection anytime the user controlling user device 105 wants to. When the user controlling user device 105 changes which users should receive the location information, the information is sent to server 1 by user device 105 and server 1 sends the information to all other user devices 106 through 111 accordingly.

Figure 4:
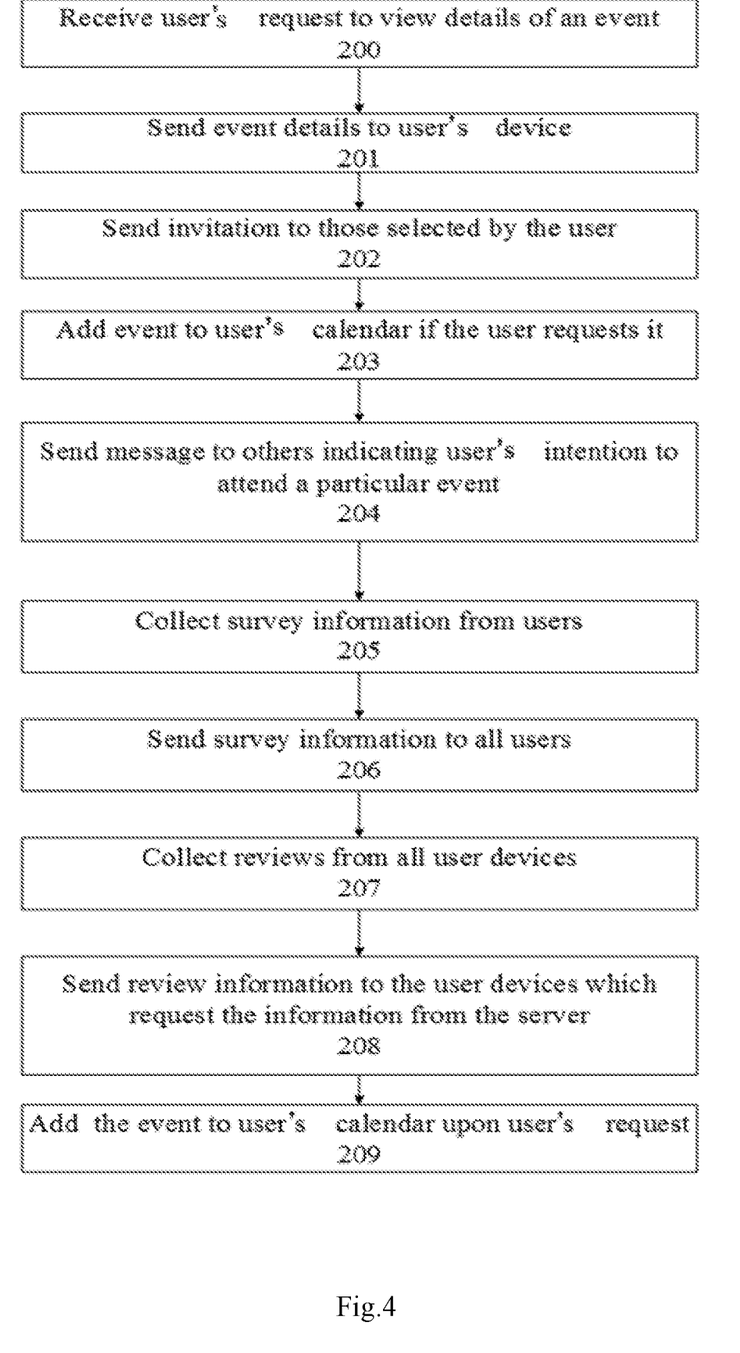
FIG. 4 shows the algorithm for interaction between a user and the server.

FIG. 4 shows the algorithm for interaction between a user and the server. In step 200, server 1 receives a user's request to view the details of an event. In step 201, server 1 sends the event details to the user device. In step 202, the server sends invitation to those that are selected by the user controlling the user device. In step 203, server 1 adds the event to the user's calendar if the user requests that action. In step 204, the server sends messages to other users indicating that the user intends to attend a particular event. In step 205, the server collects the survey information from all users that select to participate. In step 206, once the server receives all the survey input from the users the server sends the survey information to all users. In step 207, the server collects reviews from all user devices. In step 208, the review information is sent to those user devices that request the information from the server. In step 209 the server adds the event to the calendar of the user controlling the user device upon receiving a request from the user device indicating that the user controlling the user device wants the event to be added to his/her calendar.

Figure 5:
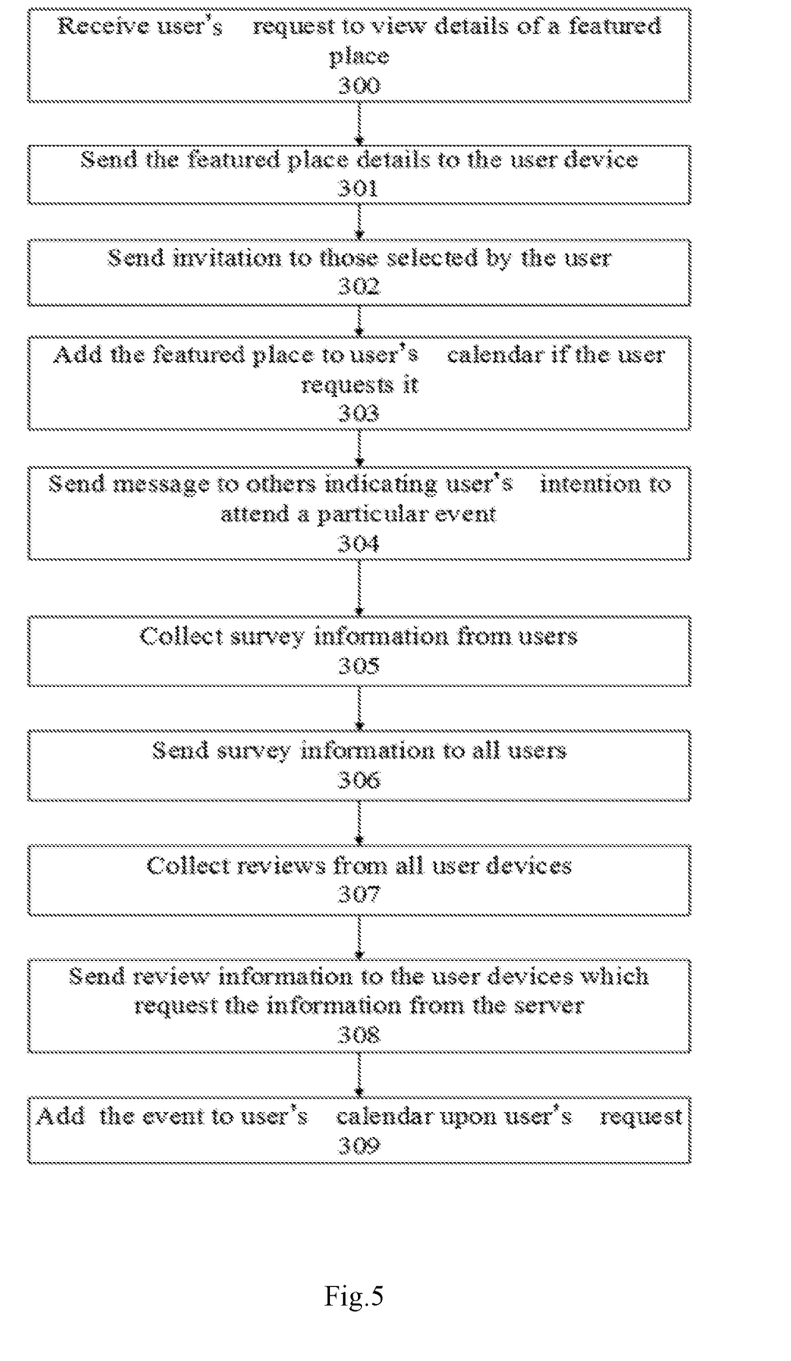
FIG. 5 shows the algorithm for interaction between a user and the server.

FIG. 5 shows the algorithm for interaction between a user and the server. In step 300, server 1 receives a user's request to view the details of a featured place. In step 301, server 1 sends the featured place details to the user device. In step 302, the server sends invitation to those that are selected by the user controlling the user device. In step 303, the server adds the featured place to the user's calendar if the user requests that action. In step 304, the server sends message to other users indicating that the user intends to attend a particular event. In step 305, the server collects the survey information from all users that select to participate. In step 306, once the server receives all the survey input from the users the server sends the survey information to all users. In step 307, the server collects reviews from all user devices. In step 308, the review information is sent to those user devices that request the information from the server. In step 309 the server adds the event to the calendar of the user controlling the user device upon receiving a request from the user device indicating that the user controlling the user device wants the event to be added to his/her calendar.

Figure 6:
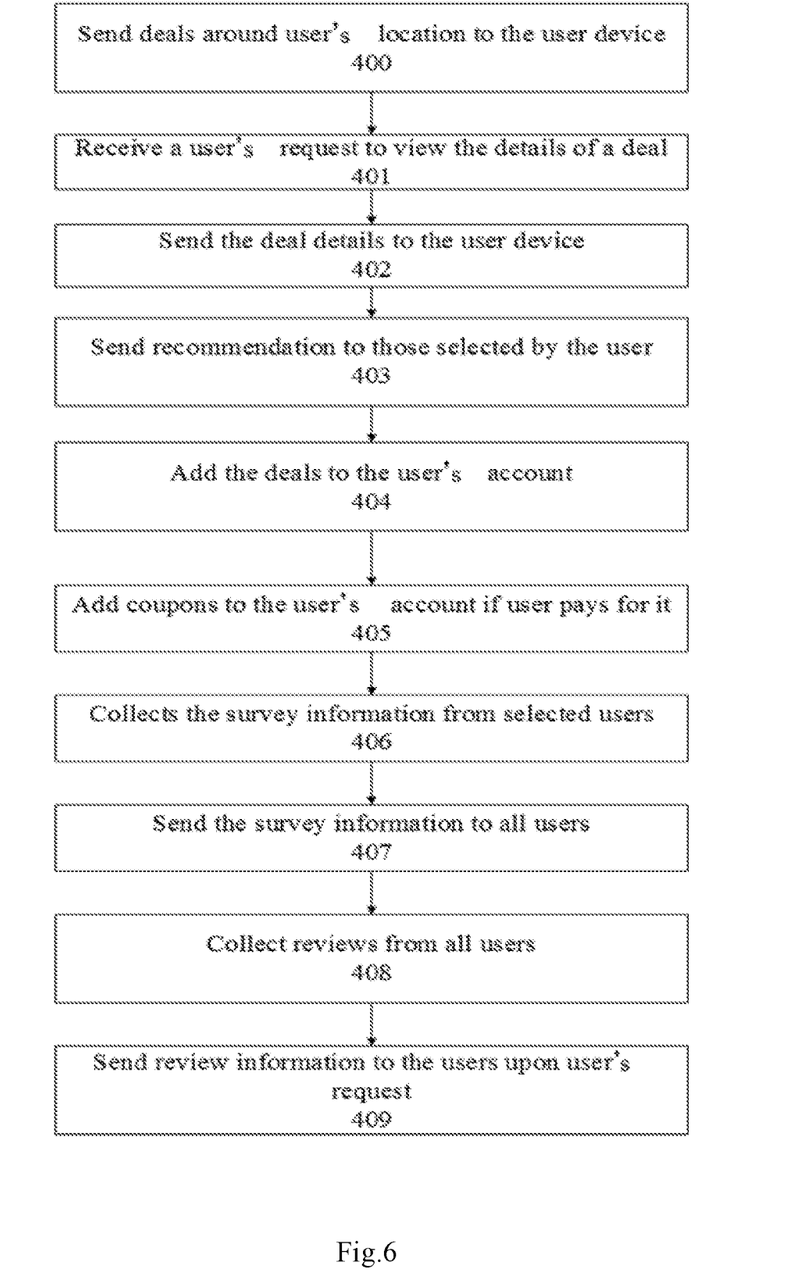
FIG. 6 shows the algorithm for interaction between a user and the server.

FIG. 6 shows the algorithm for interaction between a user and the server. In step 400, the server sends deals around user's location to the user device. In step 401, the server receives a user's request to view the details of a deal. In step 402, the server sends the deal details to the user device. In step 403, the server sends recommendation to those that are selected by the user controlling the user device. In step 404, the server adds the deals to the user's account if the user requests that action. In step 405, the server adds coupons to the user's account if the server receives a request from the user device that is initiated by the user controlling the user device and if the user controlling the user device pays for the coupons. In step 406, the server collects the survey information from all users that select to participate. In step 407, once the server receives all the survey input from the users the server sends the survey information to all users. In step 408, the server collects reviews from all user devices. In step 409, the review information is sent to those user devices that request the information from the server.

Figure 7:
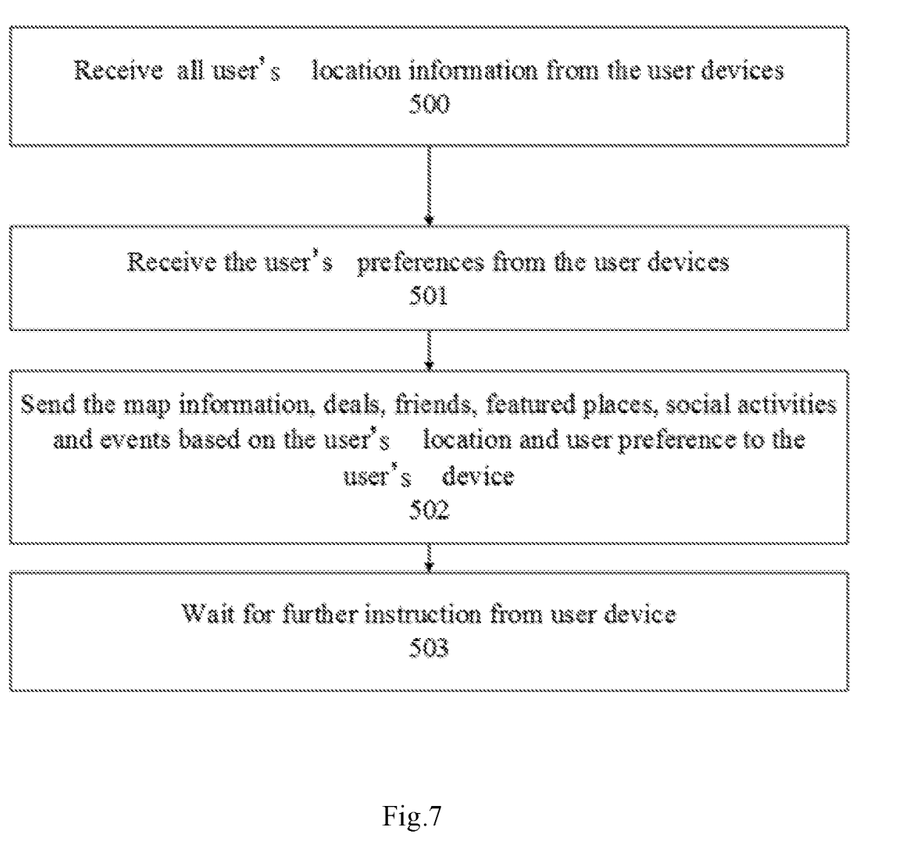
FIG. 7 shows the flow diagram of how the server sends information to the user device.

FIG. 7 shows the flow diagram of how the server sends information to the user device. In step 500 the server receives all user devices location information from the user devices. In step 501, the server also receives the users' preferences from the user devices. In step 502, based on the users' preferences the server sends the map information to the user's device. In addition to the map information, the server sends deals, friends, featured places, social activities and events based on the user's location and the user preferences. This information is displayed on the user device. In step 503 the server waits for further instructions from user devices.

Figure 8:
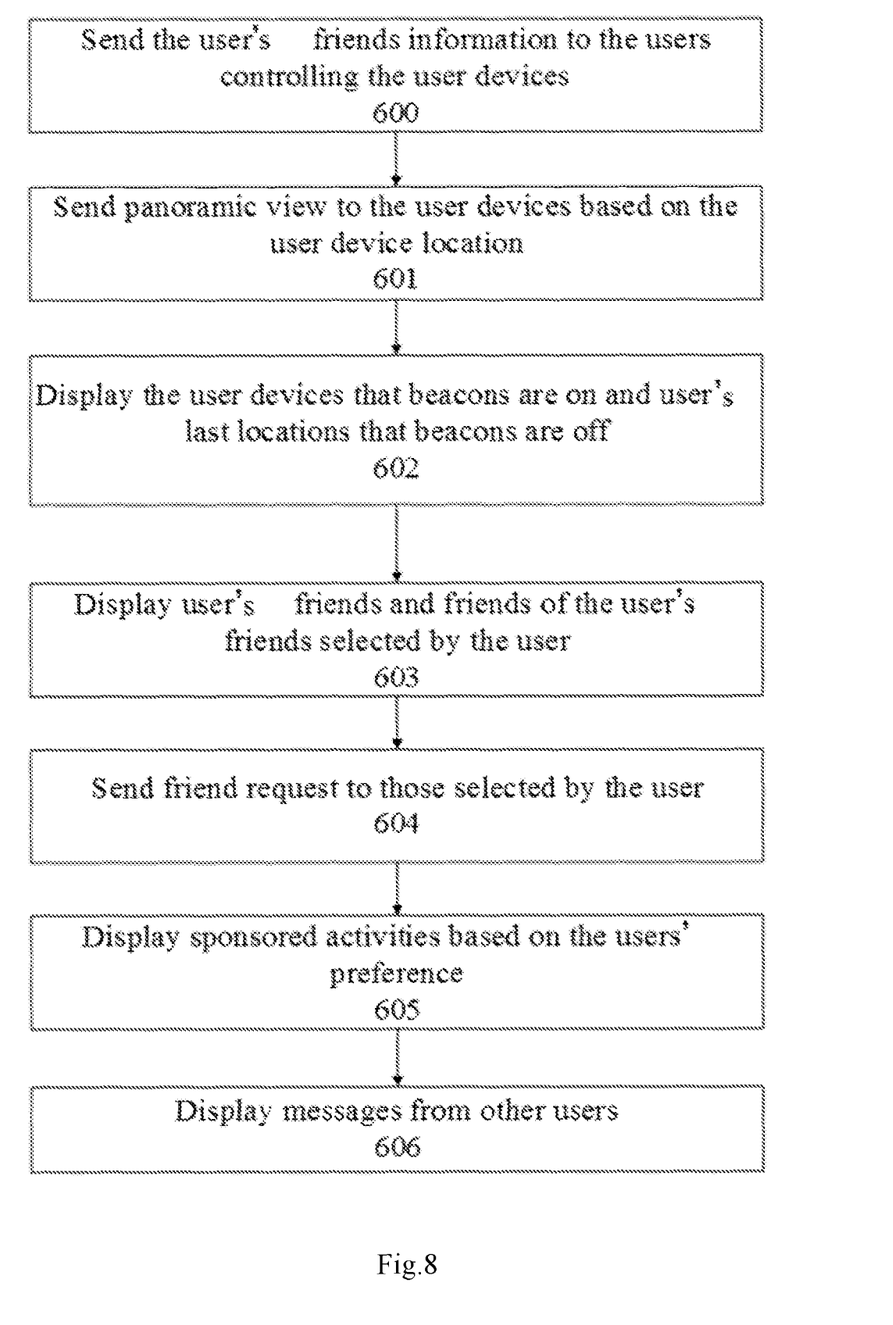
FIG. 8 shows the algorithm for interaction between a user and the server.

FIG. 8 shows the algorithm for interaction between a user and the server. In step 600, the server sends the user's friends information to the users controlling the user devices. In step 601 the server sends panoramic view to the user devices based on the user device location. In step 602, the user devices with beacons turned on are displayed on the user devices. Those user devices with the beacons turned off will have their last locations displayed on other user devices. In step 603, locations of the friends of the user are displayed. If selected by the user controlling the user device, friends of the user's friends are also displayed. In step 604, the server sends friend requests to those users selected by the user controlling the user device that sends the request to the server. In step 605, sponsored activities are displayed based on the users' preferences. In step 606, messages from other users are displayed.

Figure 9:
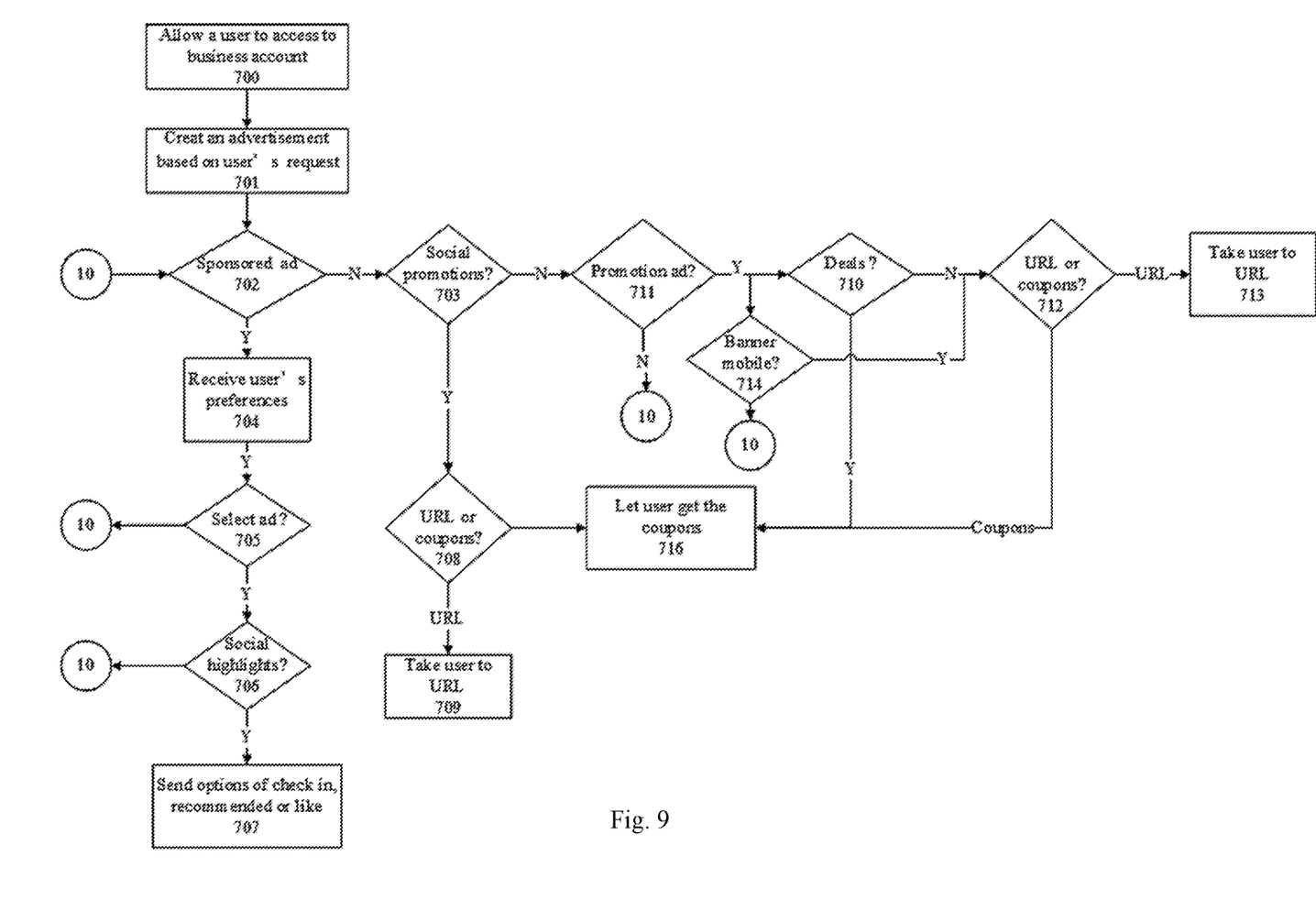
FIG. 9 shows the process of access to business account and advertisement.

FIG. 9 shows the process of access to business account and advertisement. In step 700, the server allows a user to access to business account. In step 701 the server creates an advertisement based on user's request. In step 702 the user's request is checked to find out if it is a sponsored ad request. If it is a sponsored ad request then in step 704 the server receives user's preferences from the user device. If in step 702 the user does not select sponsored ad then in step 703 the program checks if the user selects social promotions. If the user selects social promotions then in step 708, the program checks if the user wants to go to URL or wants to get coupons. If the user wants to go to URL then in step 709, the user is directed to the web site wherein the address of the web site is given in the URL. If in step 708 the user wants to have coupons then the user is directed to the step 715 where the user gets the coupons. If in step 703 the user does not select social promotions then the user is taken to step 711. In step 711 the program checks if the user selects the premium ads or not. If premium ads are selected then the user is given option to select deals or banner mobile. In step 714 the program checks if the user selects banner mobile. In step 710, the program checks if the user selects deals. If the deals are selected by the user then the program jumps to step 715 where the user is given the coupons. If in step 710 deals is not selected then the user is given the options of selecting URL or coupons in step 712. If the user selects URL then the program moves to step 713 where the user is directed to the web site that the address is given in the URL. If in step 712 the user selects coupons then the program moves to step 715 where the user is presented with coupons. In step 714 if the user does not select the banner mobile then the program jumps to step 702. In step 711 if the user does not select the premium ads then the program jumps to step 702. In step 705, if the user selects ad then the program jumps to step 706 where the user selection is checked to find out if the user selects special highlights or not. If the user selects special highlights then the program moves to step 707 where the user is given options of check in, recommended or like. The user can select one of these options. If in step 705 the user does not select ads then the program jumps to step 702. If in step 706 the user does not select special highlights then the program jumps to step 702.

In another embodiment of the invention, as shown in FIG. 3, users controlling user devices 105 through 111 may send request to the server 1 to access the business introduction page. Upon receiving this request from the users 105 through 111, the server 1 sends the information to the user devices 105 through 111 to display the business introduction page. Only those users that send the request to the server 1 receive the business introduction page on their user devices. For example in one embodiment the user controlling the user device 107 requests to display the business introduction page. The server 1 sends the information to the user device 107 to display the business introduction page on the user device 107. Upon displaying the business introduction page on the user device 107, the server 1 request the user device 107 to send the user's credentials back to the server 1. The server 1 sends the information about the user's business account if the credentials sent by the user device 107 match the information stored in the memory device in the server 1. If the credentials do not match with the information saved in the server 1, then the server 1 sends a message to the user device 107 indicating that the user does not have the credentials to access the business page. The user device 107 displays a new page directing the user to start the registration process to open a new business account. The user enters the user's information. Upon receiving the user information from the user device 107, the server 1 sends a message to the user device 107 with the user's username and user's password information. Once the user successfully logs in to the system, the user may request to view the statistics page. The user device 107 sends this request to the server 1. The server 1 sends the user's business page information to the user device 107 and the information is displayed on the user device 107.

A user can create an advertisement in this system. If the user controlling the user device 107 wants to create an advertisement, the user enters this request to the user device 107 and the user device 107 sends this request to the server 1. The server 1 sends the advertisement options to the user device 107. These options include sponsored advertisement, hot promotions, premium advertisements, deals and banner mobile. If the user selects the sponsored advertisement option then the server 1 sends new information to display additional options. These options include select advertisement type and select advertisement activity. If the user selects the select advertisement type then the server 1 sends information to the user device 107 to display the options including business highlights, social highlights and social promotions. If the user selects the social highlights option then the server 1 sends other options to be displayed by the user device 107 those options including check in, recommended and like. If the user selects the social promotions then the server 1 sends new options to the user device 107 those options including check in, plan a social and active activity.

A user can select to create an advertisement, create a social advertisement of can select from one of the options of sponsored ads, hot promotions, premium advertisements, deals and banner mobile. When the user selects one of these advertisement options, a pop up window opens and displayed on the user device 107. If the user selects sponsored advertisements, then a drop down menu will be displayed on the user divide in a new pop up window. In this window the options of select advertisement type and select advertisement target will be displayed. If the user selects the advertisement type then additional following options are displayed on the user device: business highlights, social highlights and social promotions. If the user selects social highlights, advertisement target activity will be filled up by the options of check in and recommended and like. If the user selects social promotions then the options of check in, plan a social and active activity will be filled in. If the user selects advertisement target activity then the user can upload an image for an advertisement. In that case the image selected by the user will be sent to the user device 107 by the server 1 and the image will be displayed on the user device 107. The user controlling the user device 107 can set up the advertisement such that there is either a URL connection or coupon wallets for other users. If the user selects to place a URL, when other users select the advertisement, they will be directed to the address specified in the URL that is tied to the advertisement. If the user selects the coupon wallets, then when other users select the advertisement, they will receive coupon from the advertisement and they can save the coupons in their wallets. An advertisement title can be assigned by the user that places the advertisement. Likewise, the user can provide the content for the advertisement.

The user can also define the advertisement as hot promotions. In that case the user will add the advertisement and the user can provide either an URL address or coupons for adding into users' wallet. If other users click on the advertisement then if the user provided the URL then the users will be directed to the web site that the address defined in the URL. If the user provided coupons for the advertisement, when the users select the advertisement they will be able to save the coupons into their wallets. The user can upload images and add content for the hot promotions. The user can also add a title for the advertisement under hot promotions. If the user wants to make an advertisement a hot promotions then the user has the option to select one of the previous advertisements and its associated images.

If the user wants premium advertisements, then the user can select premium advertisement option. In that case the user will add the advertisement and the user can provide either an URL address or coupons for adding into users wallet. If other users click on the advertisement then if the user provided the URL then the users will be directed to the web site that the address defined in the URL. If the user provided coupons for the advertisement, when the users select the advertisement they will be able to save the coupons into their wallets. The user can upload images and add content for the hot promotions. The user can also add a title for the advertisement under hot promotions. If the user wants to make an advertisement a hot promotions then the user has the option to select one of the previous advertisements and its associated images.

If the user selects premium advertisement and furthermore selects deals under the premium advertisement option, then the user can only assign coupons to the advertisement and cannot add URL for this advertisement. The user can add a title for this advertisement. The user can select the redemption type for the coupon. These redemption options include QR code and print. If other users select QR code then those users can upload the QR code for the deal. The QR code includes business name and deal code/details. If users elect to do so, those users can print the coupons. The user can upload images for the deals. The user can also add the name of the product applicable for the deal. The user has the option of entering multiple names. The user can also enter the business hours for a specific deal. The user can also list recommendation for certain products in the deal. Recommended products will be displayed on the deal. The user can also enter purchase price for the deal. The user can also enter the discount for a deal. The user can enter the terms and conditions for a specific deal. In that case the terms and conditions will be displayed on the coupon. If the user wants to have banner mobile advertisement then the user can select banner mobile option from the menu. In this case, mobile advertisements will be uploaded by business members and will be displayed in PSGPS mobile applications. For the banner advertisements the user can either define a URL or can provide coupon wallet. If the user selects to place a URL, when other users select the advertisement, they will be directed to the address specified in the URL that is tied to the advertisement. If the user selected the coupon wallets, then when other users select the advertisement, they will receive coupon from the advertisement and they can save the coupons in their wallets. The user can upload images for the banner mobile. The user can add the message for the mobile banner or the user can use one of the previous advertisements. Upon entering into banner advertisement, and upon entering the body of the advertisement and uploading the image, the user next moves into the area to enter other information. The first information to be entered is the target demographics information. In this section the user can enter the user's topics of interest for the advertisement. The topics of interest determine target audience for the advertisement. The user can add multiple interests separated by commas. Those advertisements will be targeted to those users who like those interests in their profile. The user can also select the advertisement to be either national or state/province wide. Advertisements will be displayed only for the section selected. The user can also select the country name or state or province name, city name and zip code. The user can also select the gender for the target audience. The user can select male, female or both. The user can select the marital status for the target audience. The user can select either married, single, in relationship or all of them. The user can select the age for target audience. The user can select an age range if the user elects to do so. The user can select the education details for target audience. The user can also select the employment details for target audience such as either employed or not. The user can also select the advertisement language. When all these filters are selected, an estimated reach of target audience will be displayed to the user.

After entering the advertisement information and the filter parameters, the user will be directed to the pricing and publishing section. The user can enter campaign name for the advertisements. The user cab select country from drop down list. The user can select the time zone. The user can enter choice of currency for payment. The user has the option of running the advertisement continuously or run advertisements in a date range. The user can select pricing options by selecting either pay per click or pay per impression. Based on the user selection the recommended price range will be displayed. The user can enter the user's maximum bid number. The user can also select payment cycle such as daily, weekly or monthly. The user can select continue to go to the next step. The user can review and confirm the advertisements that the user created previously. The list will also show the target summary based on the filter is set by the user. The pricing information for the advertisement will also be displayed. The schedule information will also be displayed. The user can place the order by clicking the order button.

Advertisements submitted by the user will be reviewed by the network administrator and orders that are approved listed under approved section whereas the orders that are rejected will be listed under the rejected section.

While the embodiments discussed above gives a person having ordinary skill in the art examples of the invention implementation, these embodiments should not be considered as limiting on the invention. The invention covers all other embodiments that are not discussed in this application. Also, the steps and elements used in the application can be altered by someone having an ordinary skill in the art. The invention covers those variations too.

What is claimed is:

1. A method for interactively providing information to a user over a network, the method comprising:
    transmitting a stream of data from a server to a first user device of a first user through the network and displaying the stream of data on the first user device;
    receiving a first user location information of the first user device through a first beacon signal from a first beacon installed on the first user device;
    receiving a first message at the server from the first user device to send an invitation to a second user device of a second user selected from a contact list of the first user device;
    sending a second message from the server to the second user device sharing the first user location information of the first user device on a social Global Positioning System (GPS) map on the second user device;
    turning on a second beacon installed on the second user device on accepting the second message via the network by the second user device and sharing a second user location information of the second user device with the first user device by the network; and
    turning off the second beacon of the second user device by deleting the second message.

2. The method of claim 1, wherein, the first user device is in movement and the server shares the first user location information of the first user device with the second user in real time over the network and displays the first user location information.

3. The method of claim 1, further comprising:
    sending directions between the first user location information of the first user device and the second user location information of the second user device from the server to the first user device and/or the second user device and displaying the directions.

4. The method of claim 3, further comprising:
    displaying a real time location of the second user device on the social GPS map on the first user device if the second bacon is on; and
    displaying a last location of the second user device on the social GPS map on the first user device if the second bacon is off, wherein, the last location of the second user device is a location recorded by the second beacon before being turned off.

5. The method of claim 2, further comprising:
    controlling sharing of the first user location information of the first user device from the first user device.

6. The method of claim 1, further comprising:
    displaying messages from friends on a message window of the first user device.

7. The method of claim 1, further comprising:
    receiving a request for a list view from the first user; and displaying events, buddies, deals and featured places in the list view.

8. The method of claim 1, further comprising:
    displaying social digest headlines;
    receiving a selection of social digest headline from the first user; and
    displaying details of the social digest headline on a same window or in a separate window.

9. The method of claim 1, further comprising:
    receiving a request from the first user of the first user device to invite friends; and
    sending a friend request to each friend selected from the contact list.

10. The method of claim 1, further comprising:
    displaying activities for a current date and time.

11. The method of claim 1, further comprising:
    receiving information from the first user to select a specific date and time; and
    displaying the first user's activities based on the specific date and time.

12. The method of claim 1, further comprising:
    providing the first user an option to select a week's view or a month's view or a year's view and displaying the first user's activities accordingly.

13. The method of claim 12, further comprising:
    displaying direction information from a current location of the first user device to a location of an upcoming activity.

14. The method of claim 12, further comprising:
    receiving information where the first user selects a specific activity;
    displaying details of the specific activity; and
    providing an option to the first user to modify or start the specific activity.

15. The method of claim 14, further comprising:
    turning on the first beacon;
    sending notifications to invitees stating that the first user is on a way to the specific activity;
    sending a message to the first user indicating the first beacon is turned on; and
    displaying locations of the invitees on the social GPS map on the first user device.

16. The method of claim 1, further comprising:
    receiving a request from the first user to plan a social event; and
    sending notices to friends selected by the first user notifying about the social event.

17. The method of claim 1, further comprising:
    displaying a number in a menu bar showing a plurality of messages the first user received; and
    identifying the plurality of messages as read messages and unread messages.

18. The method of claim 17, further comprising:
    receiving an identifying message from the first user identifying abusive messages from the plurality of messages; and
    blocking future messages from addresses from where the abusive messages arrived.

19. The method of claim 17, further comprising:
    starting a new message window when the first user selects a new message option;
    adding a user name or a beacon identifier (ID) in a sender's name field; and
    sending the new message to the user name or the beacon ID when the first user presses a send button.

* * * * *